(No Model.)
J. W. RIGLANDER.
EYEGLASSES.
No. 565,796.　　　　　　　Patented Aug. 11, 1896.
Fig. 1.
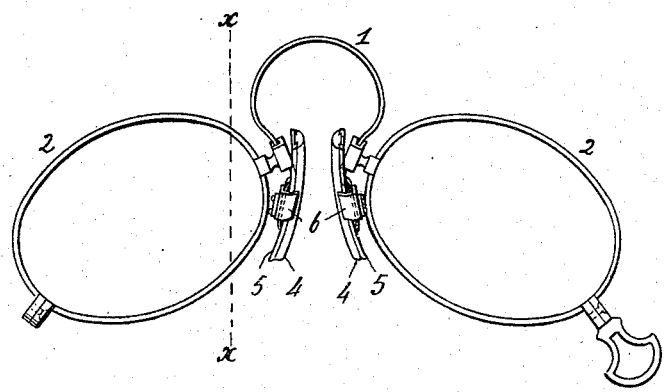
Fig. 2.
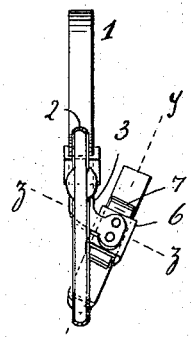
Fig. 3.　　　Fig. 5.
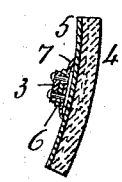　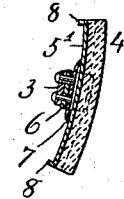
Fig. 6.　　　　　　　　　　　　Fig. 7.
Fig. 4.
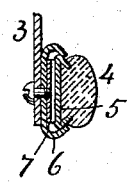
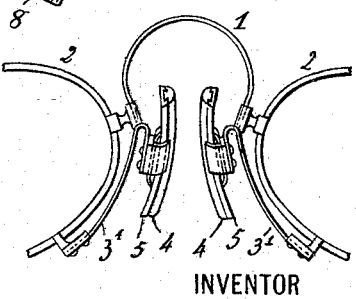
WITNESSES:
E. Wolff
Chas. E. Roensgen
INVENTOR
Jacob W. Riglander.
BY
Hauff & Hauff
ATTORNEYS

United States Patent Office.

JACOB W. RIGLANDER, OF NEW YORK, N. Y.

EYEGLASSES.

SPECIFICATION forming part of Letters Patent No. 565,796, dated August 11, 1896.

Application filed December 19, 1895. Serial No. 572,684. (No model.)

*To all whom it may concern:*

Be it known that I, JACOB W. RIGLANDER, a citizen of the United States, residing at New York, in the county and State of New York, have invented new and useful Improvements in Eyeglasses, of which the following is a specification.

The object of this invention is to make the eyeglass adaptable to various noses or sizes of nose, also to enable the eyeglass to be raised or lowered by sliding movement; and these objects are effected by means of movable or adjustable nose-pieces, as more fully set forth in the following specification and claims, and illustrated in the annexed drawings, in which—

Figure 1 is a front elevation of eyeglasses. Fig. 2 is a section along $x$ $x$, Fig. 1. Fig. 3 is a section along $y$ $y$, Fig. 2. Fig. 4 is a section along $z$ $z$, Fig. 2. Figs. 5, 6, and 7 show modifications.

In order to enable those skilled in the art to make and use my invention, I will now describe the same in detail, referring to the drawings, wherein it will be observed that the frame of the eyeglass, as herein shown, is composed of the usual bow-spring 1 and rims or bezels 2, in which the glasses are inserted. The eyeglass-frame may, however, be otherwise constructed, and the glasses may be mounted without rims, as is well known.

The frame of the eyeglass is provided with two nose-piece carriers composed of arms 3, secured to the frame and constructed or provided with dovetail portions 6, in which the nose-pieces are susceptible of being slid lengthwise or longitudinally for the purpose of adjusting them to different positions.

The nose-pieces are preferably composed of a metal or other rigid base 5 and a pad 4, of cork, celluloid, or other comparatively soft substance. The base-pieces are of a dovetail form in cross-section, so that they fit and are adapted to slide in the dovetail portions 6 of the nose-piece carriers.

The nose-pieces are held in the position to which adjusted through the medium of elastic friction-plates 7, secured, respectively, in the dovetail portions 6 of the carrier, so that they lie between the carriers and the backs of the nose-pieces and have frictional contact with the latter for the purpose of preventing them from being accidentally displaced after their desired adjustment is secured. By this arrangement the nose-pieces can be slid or adjusted to fit any nose or size of nose, or the eyeglass can be raised or lowered, as seen fit.

In Fig. 2 the nose-piece is shown set at an angle, but of course the degree as well as the direction of inclination can be varied, or, if seen fit, the nose-piece can be arranged to lie in a plane with the glasses, according to the requirements of the wearer.

The nose-piece can be left free to be slid out of the carriers, or, if seen fit, the base-piece can be provided with stops, as 8, (shown on the base-piece 5' in Fig. 5,) so that the nose-piece, while adjustable, cannot be pushed out or removed from the carrier, and security against loss is thus afforded.

Of course the invention is not confined to the exact construction shown, as modifications thereof can be made—as, for example, the nose-piece instead of being in two parts might be made of one piece. All such modifications are within the scope of my invention.

To enable the nose-piece to be fixed securely against accidental displacement, the back or face of the nose-piece, contacting with spring 7, can be toothed or made notched or rack-like for firm engagement by the spring, as seen at 9 in Fig. 6.

The arms 3 can be made rigid or springy, as seen fit, and by using spring or elastic arms, as 3', Fig. 7, the nose-pieces can be made to sit easily or comfortably.

What I claim as new, and desire to secure by Letters Patent, is—

1. The combination with an eyeglass-frame, of a nose-piece carrier secured to the frame, a nose-piece engaged with and slidable lengthwise in the carrier, and a friction-plate attached to the carrier and located between the latter and the back of the nose-piece to retain the nose-piece in the position to which adjusted by sliding it lengthwise on the carrier, substantially as described.

2. The combination with an eyeglass-frame, of a nose-piece carrier attached at one end to the frame and provided at the other end with a dovetail portion, a nose-piece having a dovetail piece which fits and is slidable lengthwise in the dovetail portion of the carrier, and an elastic friction-plate secured in the dovetail portion of the carrier and located between the latter and the back of the nose-piece to retain the nose-piece in the position to which adjusted by sliding it lengthwise on the carrier, substantially as described.

3. The combination with an eyeglass-frame, of a nose-piece carrier, and a nose-piece dovetailed to the carrier and adjustable lengthwise into different positions, and a friction-plate interposed between the carrier and the back of the nose-piece for retaining the nose-piece in the position to which adjusted by sliding it lengthwise on the carrier, substantially as described.

4. The combination with an eyeglass-frame, of a nose-piece carrier secured to the frame, a nose-piece engaged with and slidable lengthwise upon the carrier and provided with a base having a series of corrugations, and an elastic friction-plate secured to the carrier and engaging the said corrugations for retaining the nose-piece in the position to which adjusted by sliding it lengthwise on the carrier, substantially as described.

5. An eyeglass provided with adjustable nose-pieces, and friction-plates for the pieces, said pieces being notched or toothed for the engagement of the friction-plates, substantially as described.

In testimony whereof I have hereunto set my hand in the presence of two subscribing witnesses.

JACOB W. RIGLANDER.

Witnesses:
BERNARD H. BLANK,
WM. C. HAUFF.